(12) United States Patent
Huang

(10) Patent No.: US 6,679,661 B2
(45) Date of Patent: Jan. 20, 2004

(54) FASTENER FOR FRAGILE BOARDS

(75) Inventor: Pan-Ching Huang, Chuanghua (TW)

(73) Assignee: Joker Industrial Co., Ltd., Chanhgua (TW)

(*) Notice: Subject to any disclaimer, the term of this patent is extended or adjusted under 35 U.S.C. 154(b) by 0 days.

(21) Appl. No.: 10/135,356

(22) Filed: May 1, 2002

(65) Prior Publication Data

US 2003/0206784 A1 Nov. 6, 2003

(51) Int. Cl.[7] ............................ F16B 13/04; F16B 37/12
(52) U.S. Cl. .................. 411/29; 411/178; 411/387.6; 411/395
(58) Field of Search .................... 411/29, 30, 178, 411/387.6, 387.7, 395

(56) References Cited

U.S. PATENT DOCUMENTS

| | | | | |
|---|---|---|---|---|
| 5,160,225 A | * | 11/1992 | Chern | 411/178 X |
| 5,482,418 A | * | 1/1996 | Giannuzzi | 411/29 |
| 5,630,688 A | * | 5/1997 | Tran | 411/395 X |
| 5,833,415 A | * | 11/1998 | McSherry | 411/395 X |

* cited by examiner

Primary Examiner—Neil Wilson
(74) Attorney, Agent, or Firm—Troxell Law Office PLLC

(57) ABSTRACT

An improved fastener for boarding, particularly to a fastener adopted for use on fragile boards and panels such as gypsum boards mainly comprises a shank, a flange formed on one end of the shank, a drill bit formed on another end of the shank, a screw thread section formed on the peripheral surface of the shank and a center hole formed in the center of the shank for accommodating a screw nail. The shank has at least two debris troughs. Each debris trough is extended diagonally from a blade nib of the drill bit to a front section of the screw thread section. The debris troughs have a through hole formed on a rear section. The through hole extends through the center hole such that when the fastener is screwed into a board, board debris being generated is discharged through the debris troughs into the center hole and accumulated in the debris troughs to prevent the board from cracking and to increase fastening strength between of the fastener and the board, and to allow the screw to fasten securely in the center hole of the fastener.

2 Claims, 5 Drawing Sheets

FASTENER FOR FRAGILE BOARDS

BACKGROUND OF THE INVENTION

1. Field of the Invention

The invention relates to an improved nail fastener for boarding and particularly to a fastener adopted for use on fragile boards and panels such as gypsum boards.

2. Description of the Prior Art

Conventional construction boards 61 and panels 62 (as shown in FIGS. 4 and 5) that have a relatively high density but do not have great strength such as gypsum boards are prone to crack when being nailed directly by a nail fastener 51. To remedy this disadvantage, a boarding fastener 71 has been developed in the industry (as shown in FIG. 6). The boarding fastener 71 includes a shank 711 and a blade 712. The shank 711 has a top end forming a flange 713 and a screw thread section formed on the peripheral surface, and a substantially cross shaped through hole 714 formed in the center. The blade 712 is formed by extending a conical front end of the shank that being cut to form a pair of V-shaped nibs. Such a structure can decrease the damage that might otherwise incur to the gypsum board 81 when the nail is hit into the gypsum board 81. However, there are still shortcomings when it is put to practical use, notably:

When the blade 712 on the nail nib is wedged into the board 81, the blade 712 can perform drill function and discharge debris being generated from the drilling board. The debris is almost being discharged completely without remaining in the fastener 71. As a result, the wedging of the fastener 71 in the board 81 becomes too loose, and the bonding strength between the fastener 71 and the board 81, and between the screw 72 and the fastener 71 are not stronger enough. The fastening is not firm or secured. It could result in poor construction quality.

SUMMARY OF THE INVENTION

In view of aforesaid disadvantages, the primary object of the invention is to provide an improved fastener for boarding that has at least two debris troughs forming on the shank of the fastener and extending to the screw thread section and a through hole formed in the rear section of the debris troughs running through a center hole of the fastener so that a portion of the debris is discharged while a portion of th debris is retained in the fastener and the center hole, thereby the fastener can be fastened to the board firmly and securely without loosening or causing fractures or cracks on the board.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
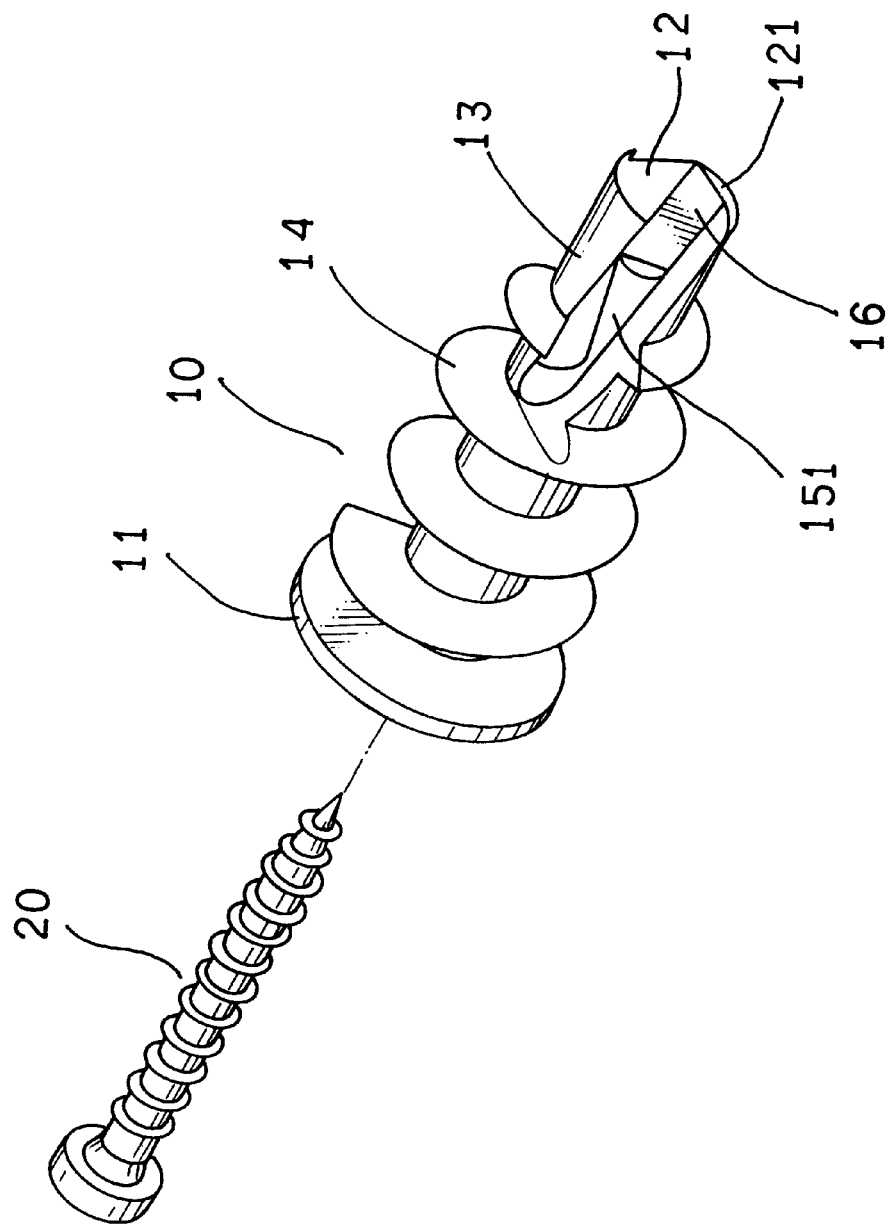
FIG. 1 is a perspective view of the invention shown with a screw nail.
Figure 2:
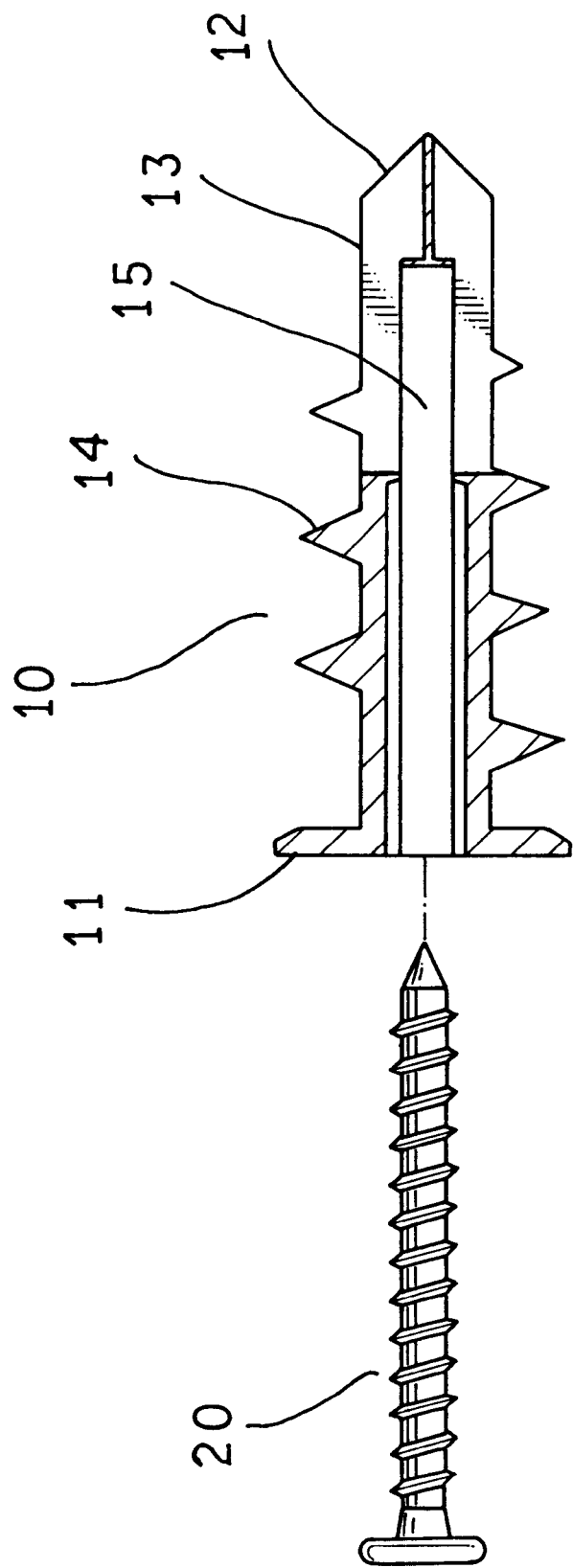
FIG. 2 is a sectional view of the invention.

Referring to FIGS. 1 and 2, the fastener 10 of the invention mainly includes a shank 13, a flange 11 formed on one end of the shank 13, a drill bit 12 formed on another end of the shank 13, and a screw thread section 14 formed on the peripheral surface of the shank 13. In the center of the shank 13, there is a center hole 15 for accommodating a screw 20.

On the shank 13 of the fastener 10, there are at least two debris troughs 16 formed thereon. Each debris trough 16 is extended diagonally from a blade nib 121 on the drill bit 12 to the front section of the screw thread section 14 (proximate to the second screw thread). The rear section of the debris troughs 16 has a through hole 151 running through the center hole 15.

Figure 3:
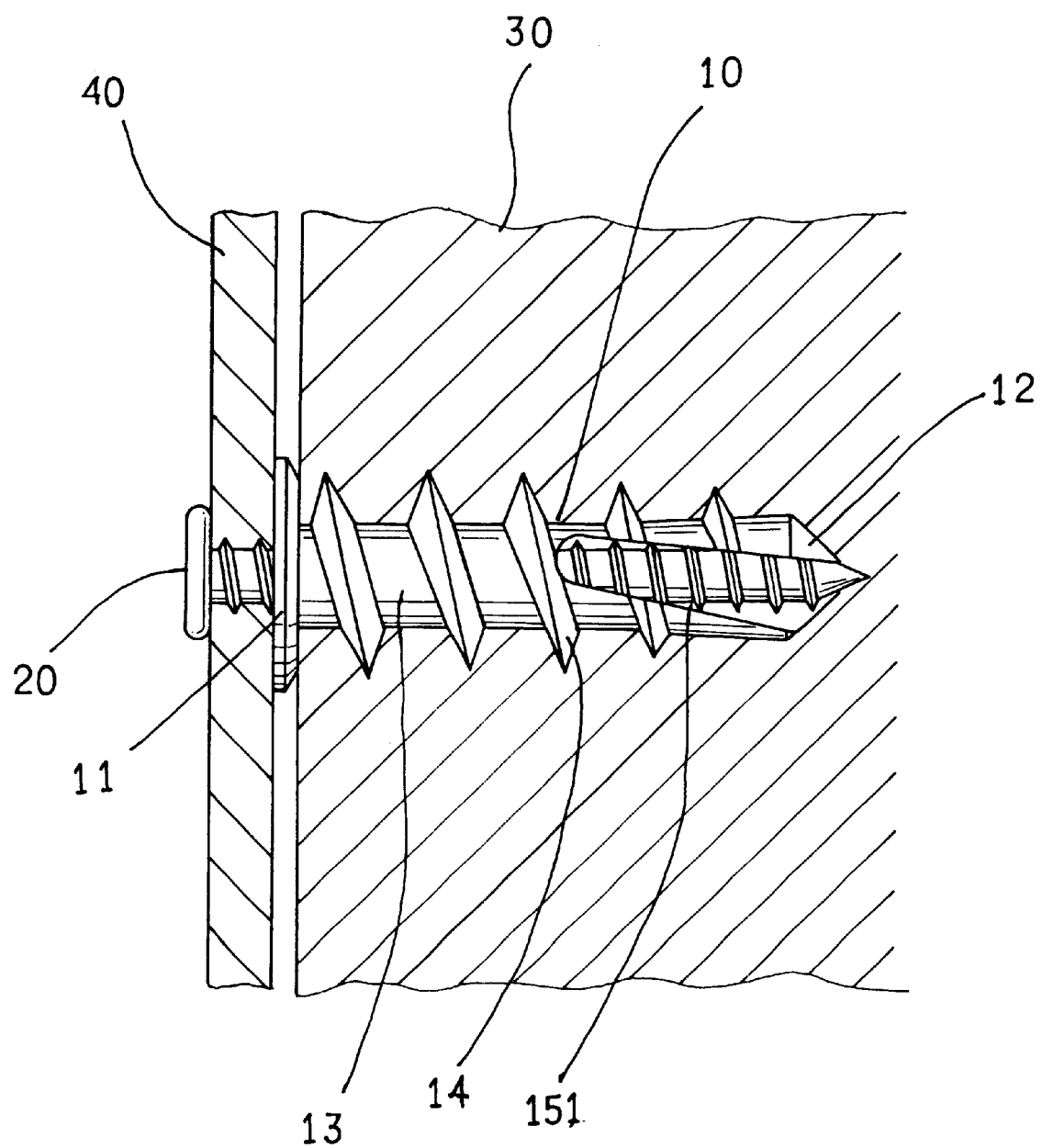
FIG. 3 is a schematic view of the invention, nailed into a board.
Figure 5:
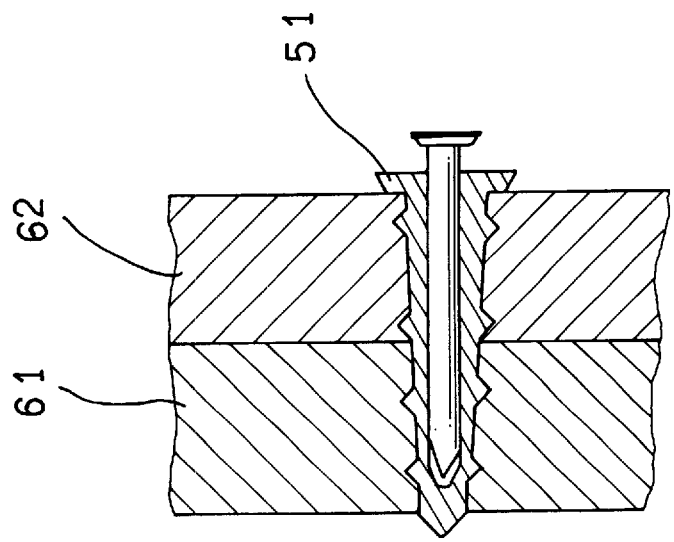
FIG. 5 is a schematic view of a conventional nail fastener nailed into a board.
Figure 4:
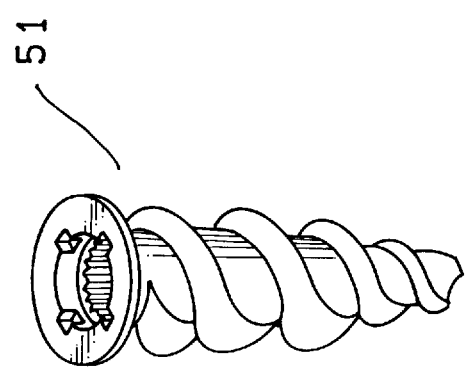
FIG. 4 is a perspective view of a conventional nail fastener.
Figure 7:
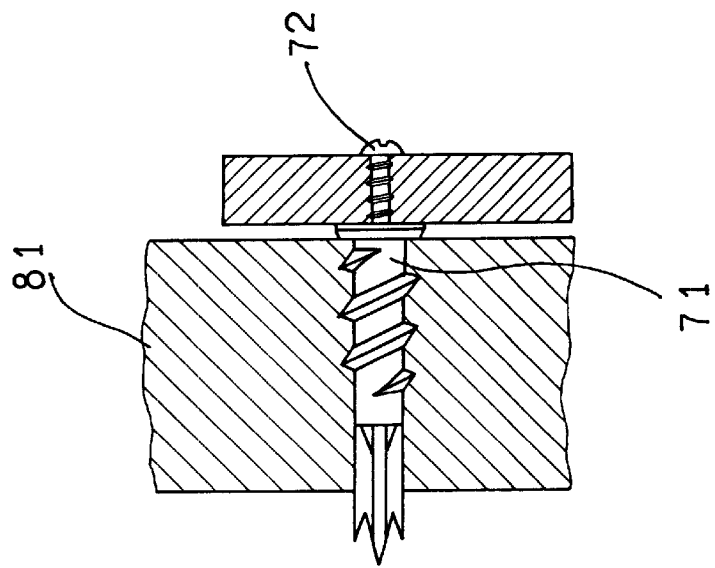
FIG. 7 is a schematic view of another conventional nail fastener nailed into a board.
Figure 6:
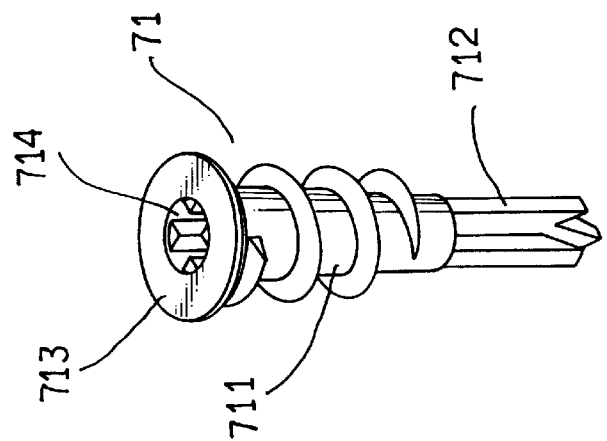
FIG. 6 is a perspective view of another conventional nail fastener.

Through the structure set forth above, when the drill bit 12 of the fastener 10 is inserted into a gypsum board 30, the debris troughs 16 on the shank 13 have a relatively large housing space for holding debris and can channel the debris out smoothly without squeezing the gypsum board 30, thus the gypsum board 30 may be prevented from cracking or fracturing. Besides discharging the debris, the debris troughs 16 can also channel a portion of the debris into the center hole 15 through the through hole 151 to increase wedging strength between the fastener 10 and the gypsum board 30. In addition, because the center hole 14 contains debris, the screw 20 may be screwed into the center hole 15 of the fastener 10 more tightly and result in more secure fastening between the panel 40 and the gypsum board 30 (as shown in FIG. 3).

By means of the construction set forth above, the fastener of the invention provides improved function and more benefits in practical use, and overcomes the disadvantages that incur to conventional nail fasteners.

While the preferred embodiment of the invention has been set forth for the purpose of disclosure, modifications of the disclosed embodiment of the invention as well as other embodiment thereof may occur to those skilled in the art. Accordingly, the appended claims are intended to cover all embodiments which do not depart from the spirit and scope of the invention.

I claim:

1. A fastener for fragile boards comprising:
   a) a shank;
   b) an outwardly extending flange formed on a first end of the shank;
   c) a drill bit formed on a second end of the shank;
   d) a screw threaded section formed on an outer periphery of the shank between the drill bit and the flange;
   e) a center hole in a center of the shank for inserting a screw; and
   f) at least two debris troughs, each debris trough formed externally on the shank and extending from a blade nib on the drill bit to a front portion of the screw threaded section, each debris trough communicating with the center hole by a through hole whereby debris generated by insertion of the fastener into the fragile board enters the center hole via the debris trough and through hole.

2. The fastener according to claim 1, wherein each debris trough extends diagonally from the blade nib on the drill bit to a second thread of the screw threaded section.

* * * * *